US 6,746,642 B2

(12) United States Patent
Buge et al.

(10) Patent No.: US 6,746,642 B2
(45) Date of Patent: Jun. 8, 2004

(54) PROCESS FOR THE PRODUCTION OF A PANEL OF COMPOSITE MATERIAL WITH STIFFENING STRIPS

(75) Inventors: Michel Buge, Saint Sebastien sur Loire (FR); Eric Rambaud, Les Sorinieres (FR); Alain Porte, Colomiers (FR); Bruno Legeay, Saint Herblain (FR)

(73) Assignee: Airbus France, Paris (FR)

( * ) Notice: Subject to any disclaimer, the term of this patent is extended or adjusted under 35 U.S.C. 154(b) by 69 days.

(21) Appl. No.: 09/849,533

(22) Filed: May 7, 2001

(65) Prior Publication Data

US 2001/0038170 A1 Nov. 8, 2001

(30) Foreign Application Priority Data

May 5, 2000 (FR) .............................................. 00 05798

(51) Int. Cl.⁷ .......................... B29C 70/44; B29C 33/38
(52) U.S. Cl. ...................... 264/510; 264/257; 264/258; 264/316; 264/317; 264/324; 264/334; 264/336; 264/511
(58) Field of Search ................................ 264/257, 258, 264/317, 322, 324, 510, 511, 512, 316, 334, 336

(56) References Cited

U.S. PATENT DOCUMENTS

| 3,608,052 A | * | 9/1971 | Gunn | 264/137 |
|---|---|---|---|---|
| 4,304,376 A | * | 12/1981 | Hilton | 244/123 |
| 4,675,061 A | * | 6/1987 | Mead | 156/155 |
| 4,681,724 A | * | 7/1987 | Faiz et al. | 264/257 |
| 4,853,172 A | * | 8/1989 | Jacaruso et al. | 264/571 |
| 4,923,545 A | | 5/1990 | Dickerson | |
| 4,946,526 A | * | 8/1990 | Petty-Galis et al. | 156/155 |
| 5,425,986 A | * | 6/1995 | Guyette | 428/283 |
| H1621 H | * | 12/1996 | Ray | 428/174 |
| 5,981,025 A | * | 11/1999 | Marshall et al. | 428/116 |
| 6,458,309 B1 | * | 10/2002 | Allen et al. | 264/319 |

FOREIGN PATENT DOCUMENTS

| EP | 0 650 825 | 5/1995 |
|---|---|---|
| GB | 1 522 432 | 8/1978 |

* cited by examiner

Primary Examiner—Stefan Staicovici
(74) Attorney, Agent, or Firm—Young & Thompson

(57) ABSTRACT

A process for the production of a panel (7) of composite material with stiffening strips (3), in which a mold (1) is draped with at least one first ply (2) of fibers pre-impregnated with resin, there is emplaced at desired positions on said ply (2) at least one stiffening strip (3), the stiffening strip (3) as well as at least a portion of the remaining surface of the first ply (2) is covered with at least one second ply (4) of fibers pre-impregnated with resin, then a bladder (6) is placed to cover the above elements, the assembly is then placed under vacuum and then in an autoclave to polymerize the resin. Before emplacement of the stiffening strip (3) and/or of the second ply (4), there is interposed at least one layer (5) of a non-adherent material between at least one portion of the surface of the stiffening strip (3) and one and/or the other of the plies (2, 4).

8 Claims, 1 Drawing Sheet

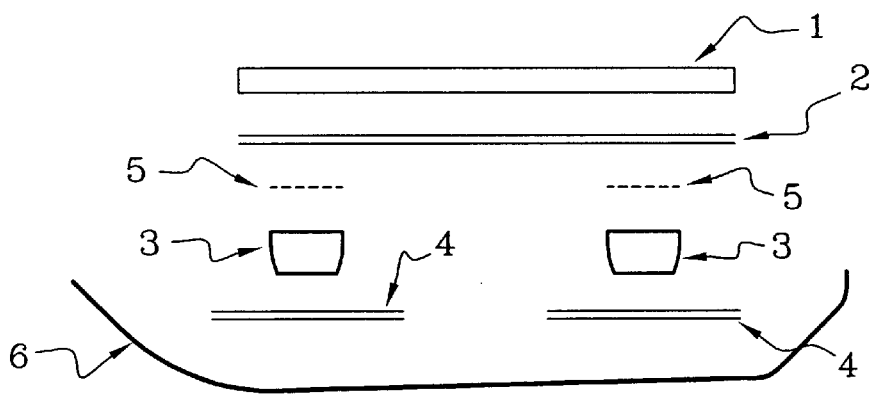
Fig. 1
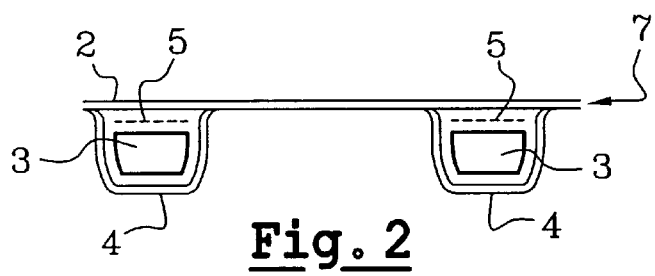
Fig. 2
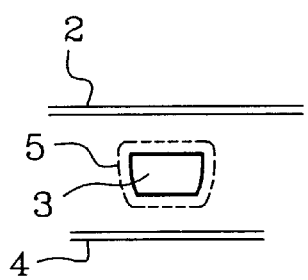 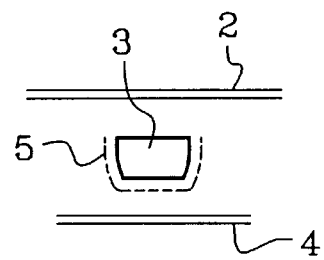
Fig. 3a  Fig. 3b
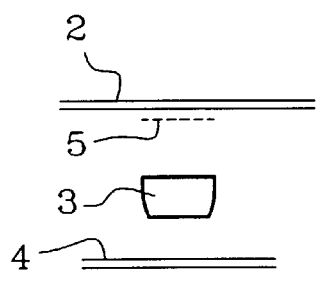 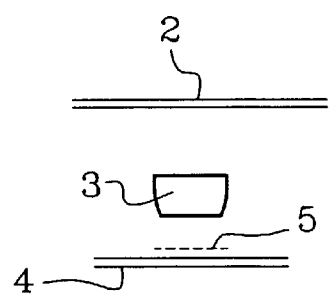
Fig. 3c  Fig. 3d

PROCESS FOR THE PRODUCTION OF A PANEL OF COMPOSITE MATERIAL WITH STIFFENING STRIPS

The present invention relates to the production of panels of composite material provided with local stiffening, by the draping/molding technique.

This technique, which consists in draping on a suitable tool called a mold, pre-impregnated fibers of resin, applying on these fibers a film or bladder, drawing a vacuum between the bladder and the fibers, then placing the assembly thus obtained in an autoclave to subject it to a polymerization cycle ensuring the curing of the resin, permits obtaining panels of shapes and dimensions that are quite precise, adapted for various usages.

The invention relates more particularly to shaped panels that can constitute the nacelle of aircraft motors.

Such a nacelle is generally constituted by several composite panels produced in two parts and then assembled together. The shape of the panels is computed by aerodynamic specialists so as to limit the drag adjacent the air foil. As a general rule, it is usually curved and of large size. During production of each panel, it is important to keep this form so as to preserve the shapes and dimensions.

So as to rigidify the shape and to guarantee the dimension of these panels, local stiffening is used.

Different techniques are used at present.

The panel can be stiffened by a continuous cellular structure, covering all the surface of the panel. This cellular structure is sandwiched between two layers of fibers or pre-impregnated plies.

In the case of a single curing, during production of such a panel, upon placing under vacuum, the plies of the layer of pre-impregnated fibers have the tendency to sink into the open cells of the cellular structure. Thus, before the polymerization temperature of the resin is reached, the consistency of these fabrics is soft. At the end of the cycle, the panel thus formed comprises hollows which modify the aerodynamic shape.

To overcome these problems, there exist two solutions:

using a cellular structure with small cells such that the plies of the layer of fibers cannot sink into them. The principal drawback is the weight of the panel produced, because the smaller the size of the cells, the greater the density of the structure, producing the panel in several steps. First, the layer of pre-impregnated fibers is cured, because once hardened, the layer cannot sink into the cells of the cellular structure. Upon the second curing, there is added the cellular structure and the last layer. This process requires producing the panel in several steps requiring a fairly long production time, as well as a large number of different tools.

Moreover, this technique has the drawback of being difficult to repair by the user, once the panel becomes damaged. In case of shock, moisture may seep into the cellular structure, degrading the structural properties of said structure and requiring a very precise repair according to the very strict rules.

Another technique consists in using local stiffeners, in the form of strips of cellular structure or foam strips. The use of a cellular structure gives rise to the same drawbacks, although reduced, as in the preceding technique, namely: sinking of the plies of fibers, the weight of the panel, the difficulty of repair, the need for several polymerization cycles, and the risk of moisture uptake as a result of shock.

Foam has the advantage of avoiding the pre-impregnated plies of fibers sinking in, because it has no open cells. It nevertheless has a major drawback: the plies of pre-impregnated fibers sink during cooling of the panel because of the difference of coefficient of expansion between said fibers and the foam. This problem exists moreover also with cellular structure. Thus, the materials used to produce stiffening strips (foam, cellular structure, . . . ) have in general a coefficient of expansion that is greater than the pre-impregnated materials. In the autoclave, at the polymerization temperature, the plies of pre-impregnated material solidify whilst the material of the stiffening strip dilates. During cooling of the piece, said material retracts to return to its initial position (before heating) and carries with it the solidified composite material, causing sinking. As a result, slight hollows appear on the panel, which modifies the fluid flow and generates unacceptable aerodynamic drag. Moreover, these hollows weaken the panel by generating the onset of flexure. In this case, the foam strip or structure necessarily has a structural role to compensate this force. This requires strict repair rules.

It is possible to avoid the use of a cellular structure by replacing it with localized shaped stiffeners. These localized stiffeners can have different shapes (Z, U, I, . . . as a function of the place where they are positioned. They are first made of a composite material, by the draping/molding technique, on tools specific to their shape. There must accordingly be as many tools as shapes to be produced. The production of the panel takes place in two steps: curing of the layer of pre-impregnated fibers, then cementing of the localized stiffeners.

This cementing operation requires very precise tools, because there exist problems of adaptation between the stiffeners and the panels, namely problems of contraction at the points of contact. This technique generates risks of loosening of the stiffeners, in addition to multiple polymerization operations.

Thus, in the present economic context, in which the highest quality is sought at the best price, the preceding techniques although used in industry have not been entirely satisfactory.

The present invention seeks to overcome the drawbacks of the known techniques by providing a process for the production of panels of composite material with stiffening strips, by the technique of draping/molding/polymerization, guaranteeing the shape and dimensions of the panels after demolding particularly by avoiding any sinking of the fibers into the stiffening strips, whilst permitting production in what can be a very short time and without requiring too complicated a production cycle.

To this end, the invention has for its object a process for the production of a panel of composite material with stiffening strips, in which a mold having the shape and size of the panel to be produced is draped with at least a first ply of fibers pre-impregnated with resin, resin placed at the desired positions on said ply at least stiffening strip, the stiffening strip as well as at least a portion of the remaining surface of said first play is covered with at least one second ply of fibers pre-impregnated with resin, then a bladder is emplaced, covering the above elements; there is established a suitable vacuum in the space between the mold and the bladder, the assembly is then placed in an autoclave to be subjected to a pre-established polymerization cycle for the resin, at suitable pressures and temperatures for said resin, and finally, the panel is demolded, characterized in that prior to said emplacement of the stiffening strip and/or of the second ply, there is interposed at least one layer, film or the like of a non-adherent material between at least one portion of the surface of the stiffening strip and one and/or the other of said plies.

With such a process, the non-adherent material, interposed between the layer of pre-impregnated fibers and a stiffening strip of the type with a cellular structure, avoids sinking of the plies into the cells of the cellular structure. It moreover avoids, during curing, this stiffening strip becoming secured to the layer of composite material. Thus, during cooling, the material used for the stiffening strip can be withdrawn without disturbing the solidified layer of composite material. The surface of the panel is thus not modified, which keeps its aerodynamic shape.

Moreover, as the stiffening strip or strips can be totally enclosed within said non-adherent material, there is no longer adhesion between the strips and the composite material. The panel is thus unaffected by the expansion of the strips and hence to the deformations which they can cause.

Also, the stiffening strips no longer being working and thus having no more force to transmit, any low density material which can nevertheless withstand the temperatures and pressures of the polymerization cycle, can be used to produce said strips. They can thus be particularly of a cellular or foam structure.

It is also to be noted that if desired, the stiffening strips can be withdrawn after demolding the panel, because they do not adhere to the composite material.

The process described above in the framework of practice including a single cure, is suitable also for two-stage curing, namely a first curing of the superposed plies constituting the first layer of composite material to be placed on the bottom of the mold, so as to rigidify this first layer, then a second cure after emplacement of the stiffening strips, non-adherent layers, second layer of composite material, so as to rigidify the assembly, each cure being of course carried out after emplacement of a bladder, placed under vacuum, and then autoclaved.

Such a polymerization in two stages is possible because there is no longer risk of the plies sinking due to the different coefficients of expansion of the material used.

The non-adhered material is for example selected from the group consisting of Teflon® and silicone-base compounds.

The invention also has for its object panels with stiffening strips, obtained according to the process.

Other characteristics and advantages will become apparent from the following description of embodiments of the process of the invention, given only by way of example and with respect to the accompanying drawing, in which:

FIG. 1 is a diagram showing the emplacement in a mold of the various elements constituting a panel according to the invention;

FIG. 2 shows the panel of FIG. 1, after polymerization and demolding, and

FIGS. 3a to 3d show schematically different embodiments of placement of a layer or film of non-adherent material about each stiffening strip.

In FIG. 1, there is shown very schematically at 1 a mold adapted for the production of a panel of composite material with two stiffening strips, of flat shape and dimensions corresponding to those of the mold 1, which is seen in cross-section in the figure, its opening being turned downward.

As a first step, there is draped on the bottom of the cavity of mold 1 one or several plies 2 of fibers pre-impregnated with resin, of suitable dimensions, the surface of the stack of plies turned toward the bottom of the mold corresponding to the external surface of the panel to be produced.

The fibers are fibers of carbon, kevlar, glass or any other mineral or organic material, natural or synthetic, useful in the envisaged applications, and are pre-impregnated with a suitable thermoplastic or thermosetting resin.

Then, there are emplaced two stiffening strips 3 and a layer 4 formed by one or several plies of fibers pre-impregnated with resin, for example of the same type as that of the fibers of the layer 2, with the interposition between the stiffening strips 3 and the layer 2, of a layer, film, sheet or envelope 5 of a non-adherent material.

The stiffening strips 3 are for example elongated elements of slightly trapezoidal cross-section, of a length corresponding to that of the panel to be produced, constituted in known manner, of a cellular structure such as honeycomb, for example the material called ROHACELL, or foam, or any other suitable material, of low density and capable of withstanding the temperatures and pressures of polymerization of the resins of the composite materials used.

The non-adherent material 5 is constituted for example by a sheet of film of Teflon or of a material of the silicone family, interposed, as shown in FIG. 1, between the first layer 2 and the surface of the stiffening strips 5 turned toward said first layer, the dimensions of the sheet 5 corresponding to those of said surface of the strips.

There will be seen further on the manner of application of the sheets 5, with reference to FIGS. 3a to 3d.

After the emplacement of the elements 3 and 5 on the layer 2, the internal layer of the panel, constituted by two separate portions 4, is disposed so as to cover totally the strips 3. More precisely, each portion 4 is dimensioned so as to be able to cover totally one of the strips 3 and extending slightly beyond each side, which is to say by covering the adjacent region of the exposed surface of the layer 2 entirely about each stiffening strip.

The two portions 4 could of course be only one and could cover both the strips 3 and all the remaining exposed surface of the layer 2.

Moreover, the portion or portions 4 are formed by one or several plies for example similar to those of the layer 2.

The assembly is then entirely covered with a bladder 6 and a predetermined vacuum is drawn in the space between bladder 6 and mold 1, in known manner.

The assembly is then placed in an autoclave to be subjected to a polymerization cycle of the resin of the layers 2, 4 according to the process using pressures and temperatures suitable to the nature of the resin, in a known manner.

After polymerization, the panel 7 is unmolded and has the appearance shown in FIG. 2, the panel being seen in cross-section.

The stiffening strips 3 permit rigidifying the shape of the panel 7 and guaranteeing its dimensions. The strips 3 ensure the shaping of the final layer 4 of pre-impregnated fibers, by defining troughs whose role is to stiffen the panel 7. It is to be noted that the slightly trapezoidal cross-section of the strips 3 contributes to better distributing the pressure exerted by the bladder 6, which bears thereagainst in a uniform manner on the strips over all and particularly on the lateral sloping sides.

Once the layer 4 is shaped, the stiffening strips 3 no longer have use, because they are non-adherent, being no longer secured to the principal layer 2 of the panel 7 because of the shield of non-adherent material 5.

Thus, during cooling after passage through the autoclave, the material used for the stiffening strips 3 can be withdrawn without involving the solidified layer of the composite material 2. The surface of the panel 7 is thus not modified, which keeps its aerodynamic shape.

Another result of the non-working character of the stiffening strips 3 is the possibility of using a very light material so as not greatly to increase the weight of the panel.

The presence of the material 5 also avoids sinking of the plies of the layer 2 into the cells of the strips 3, when these latter have a cellular structure, thereby avoiding the localized appearance of slight hollows on the external surface of the panel 7.

In the example of FIGS. 1 and 2, the non-adherent material 5 is interposed only between the external layer 2 of the panel and the stiffening strips.

The sheet 5 of material could be rendered adhesive over one surface or over both surfaces for precise positioning of the stiffening strips 3 on the layer 2.

The non-adherent material 5 can be constituted by a sprayed layer for example or applied by brush like a paint.

As shown in FIG. 3a, the non-adherent material 5, no matter what its nature or its manner of application, can be applied over all the sides of the stiffening strip 3 so as to envelope it completely.

The material 5, according to the modification of FIG. 3b, is interposed between the stiffening strip 3 and the final layer 4 covering the strip.

FIG. 3c shows the case of application of the layer 5 directly on the layer of composite material 2, the dimensions of the layer 5 corresponding precisely to those of the facing surface of the strip 3 so as to avoid problems of adherence with the final layer 4.

Finally, the layer 5 can be applied directly (FIG. 3d) on the layer 4 of composite material covering the stiffening strip 3.

It is to be noted that the properties of the non-adherent material 5 permit withdrawing the stiffening strips 3 once the panel is demolded.

Thus, by interposing between the stiffening strips 3 and the layers of pre-impregnated fibers 2 and 4, two layers, sheets or films of non-adherent material 5, it will be possible when the panel is demolded, to push the stiffening strips to slide them out of the panel, one of the sleeves of non-adherent material remaining secure to each stiffening strip, and the other sleeve remaining in place in the recess of the strip.

The molding/draping technique permits using a mold delimiting a cavity whose shape and dimensions correspond to those of the panel to be produced.

This shape and these dimensions can be anything at all, without departing from the scope of the invention.

In particular, the process of the invention permits producing not only a flat panel but also a panel having more complicated shapes.

The plies of the fibers constituting the layers 2 and 4 are plies of fiber cloth or roving.

So as to improve the surface condition of the panel 7, there can be applied a surface film, for example a resin ply, on the external surface of the panel exposed to the aerodynamic flow, so as to level the micro defects and to plug possible irregularities that can appear during production of the panel, thanks to the supplemental resin supply resulting from the surface film.

The process described above permits producing a panel 7 with a single cure, thereby appreciably saving production time.

Single curing also permits avoiding the appearance of parasitic stresses at the points of contact. Thus, the different layers harden only when the cure is complete, which promotes the contact between the different elements, namely the plies of pre-impregnated material (2, 4), the stiffening strips 3 and the layers 5 of non-adherent material.

However, the process of the invention can be used with two cures, one for the external layer 2 of the panel, with one or several superposed plies, and the other being carried out after emplacement of the stiffening strips 3, the non-adherent material 5 and the covering layer or layers 4, at the end of rigidification of the assembly.

Such a two-stage cure is possible because there is no longer the risk of the plies of composite material sinking due to the different coefficients of expansion of the materials used.

Finally, the invention is obviously not limited to the embodiments described and shown above but also covers any modifications, particularly as to the shape and dimensions of the panel 7, the stiffening strips 3, the nature and number of plies of the layers 2 and 4 and the nature and modes of application of the non-adherent material interposed between the stiffening strips 3 and the composite material (2, 4).

What is claimed is:

1. Process for the production of a panel (7) of composite material with stiffening strips (3), in which a mold (1) having the shape and size of the panel to be produced, is draped with at least one first ply (2) of fibers pre-impregnated with resin, there is emplaced at desired positions on said ply (2) at least one stiffening strip (3), the stiffening strip (3) as well as at least a portion of the remaining surface of said first ply (2) is covered with at least one second ply (4) of fibers pre-impregnated with resin, then a bladder (6) is positioned to cover the above elements to form an assembly, a suitable vacuum is drawn in the space between the mold (1) and the bladder (6), the assembly is then disposed in an autoclave to subject it to a pre-established polymerization cycle for the resin, at temperatures and pressures suitable to said resin, and finally, the panel is demolded; the improvement wherein the stiffening strip (3) is a cellular honeycomb structure, and prior to said emplacement of the stiffening strip (3) and/or of the second ply (4), there is interposed at least one layer (5) of a non-adherent material between at least a portion of the surface of the stiffening strip (3) and one and/or the other of said plies (2, 4), said non-adherent material preventing said plies from sinking into cells of said cellular honeycomb material.

2. Process according to claim 1, characterized in that each stiffening strip (3) is totally enclosed by at least one layer (5) of non-adherent material.

3. Process according to claim 2, characterized in that each stiffening strip (3) is totally surrounded by said layer (5) and is withdrawn from the panel (7) after demolding.

4. Process according to claim 1, characterized in that the layer of composite material constituted by said first ply or plies of pre-impregnated fibers, is subjected to curing before emplacement of said stiffening strips (3), layer (5) of non-adherent material and second ply or plies.

5. Process according to claim 1, characterized in that the non-adherent material (5) is selected from the group consisting of Teflon and compounds of the silicone family.

6. Process according to claim 1, characterized in that between the mold (1) and said first ply (2) there is interposed a surfacing film.

7. Process according to claim 3, characterized in that the layer of composite material constituted by said first ply or plies of pre-impregnated fibers, is subjected to curing before emplacement of said stiffening strips (3), layer (5) of non-adherent material and second ply or plies.

8. Process according to claim 7, characterized in that the non-adherent material (5) is selected from the group consisting of Teflon and compounds of the silicone family.

* * * * *